United States Patent [19]
Koyanagi et al.

[11] Patent Number: 6,053,272
[45] Date of Patent: Apr. 25, 2000

[54] ENGINE MOUNT FOR SADDLE-SEAT VEHICLE

[75] Inventors: Masashi Koyanagi; Yoshihiro Kimura; Toshikazu Tanaka; Toshinari Mohara, all of Saitama, Japan

[73] Assignee: Honda Giken Kogyo Kabushiki Kaisha, Tokyo, Japan

[21] Appl. No.: 08/806,294

[22] Filed: Feb. 26, 1997

Related U.S. Application Data

[60] Provisional application No. 60/012,260, Feb. 26, 1996.

[51] Int. Cl.[7] ....................................... B60K 5/12
[52] U.S. Cl. ......................... 180/299; 180/228; 180/300
[58] Field of Search ................................... 180/300, 311, 180/312, 228, 291, 299; 248/554, 557, 638; 244/54

[56] References Cited

U.S. PATENT DOCUMENTS

| | | |
|---|---|---|
| 716,604 | 12/1902 | White . |
| 1,729,381 | 9/1929 | Golden . |
| 3,783,961 | 1/1974 | Hooper ........................ 180/300 |
| 4,412,597 | 11/1983 | Aiba ............................ 180/228 |
| 4,535,869 | 8/1985 | Tsutsumikoshi et al. ........ 180/311 |
| 4,856,751 | 8/1989 | Ohba .......................... 180/291 |
| 5,273,131 | 12/1993 | Uchiyama ..................... 180/293 |

FOREIGN PATENT DOCUMENTS

| | | |
|---|---|---|
| 163018 | 7/1986 | Japan ........................... 180/228 |
| 8-4815 | 1/1996 | Japan . |
| 487682 | 6/1938 | United Kingdom ............ 180/228 |

*Primary Examiner*—Anne Marie Boehler
*Attorney, Agent, or Firm*—Birch, Stewart, Kolasch & Birch, LLP

[57] ABSTRACT

An engine mount for a saddle-seat vehicle includes an upper engine mount operatively connected to the engine of the vehicle. The upper engine mount operatively connects the engine to the frame of the vehicle. At least one connector is provided for connecting the engine to the upper engine mount. The upper engine mount permits substantially free vertical movement of the engine relative to the frame. The upper engine mount includes an outer sleeve operatively connected to the frame. The upper engine mount further includes an elastic cushion arranged between the connector and the outer sleeve. The upper engine mount may further include an inner sleeve located within the elastic cushion for passage of the connector therethrough. The upper engine mount further includes a plate bracket operatively connected between the outer sleeve and the frame. The plate bracket may include lightening holes therein for decreasing the weight of the plate bracket while increasing flexibility of the plate bracket. The upper engine mount substantially reduces or eliminates the transmission of engine vibration to the seat and the rider of the vehicle.

18 Claims, 7 Drawing Sheets

ENGINE MOUNT FOR SADDLE-SEAT VEHICLE

This application is a continuation of Provisional Application No. 60/012,260 filed Feb. 26, 1996, the entire contents of which are hereby incorporated by reference.

The invention relates to an engine mount structure for a saddle-seat vehicle, such as an all terrain vehicle, ATV, where the engine is located generally in the center of the frame.

DESCRIPTION OF THE BACKGROUND ART

Various engine mounting arrangements are known in the prior art. For example, U.S. Pat. No. 4,535,869 and U.S. application Ser. No. 08/465,332 based on Japanese document 6-140587 discuss arrangements for mounting an engine. While these arrangements will dampen vibration from an engine, they can adversely effect the responsiveness of the vehicle. For example, when used in an ATV, these mounts can cause a delay from application of the accelerator to movement of the vehicle. Therefore, it is desired to provide an engine mounting structure which will adequately dampen vibration while not adversely effecting responsiveness or drivability of the vehicle.

SUMMARY OF THE INVENTION

Accordingly, it is a primary object of the present invention to provide an engine mount for a saddle-seat vehicle which will satisfactorily hold the engine while reducing vibration transferred from the engine to the vehicle seat.

It is a further object of the present invention to provide an engine mount for a saddle-seat vehicle which provides for improved responsiveness or drivability of the vehicle.

Yet another object of the present invention is to provide an engine mount for a saddle-seat vehicle which has fewer parts than known prior art engine mounting arrangements. Such an engine mount would be simpler and less expensive to manufacture and maintain.

A further object of the present invention is to provide an engine mount for a saddle-seat vehicle which is not limited in the placement of the engine mounting structure. Therefore, great variability can be had in designing the vehicle.

Yet another object of the present invention is to provide an engine mount for a saddle-seat vehicle whereby lag time or responsiveness can easily be controlled. Therefore, great freedom in selecting the spring rate of the mounting structure can be had.

Still another object of the present invention is to provide an engine mount for a saddle-seat vehicle which solves the above-mentioned problems with the prior art mounting structures by using a simple design.

These and other objects of the present invention are fulfilled by an engine mount for a saddle-seat vehicle having an upper engine mount operatively connected to the engine of the vehicle, the upper engine mount operatively connecting the engine to the frame of the vehicle, and at least one connector for connecting the engine to the upper engine mount, the upper engine mount permitting substantially free vertical movement of the engine relative to the frame.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
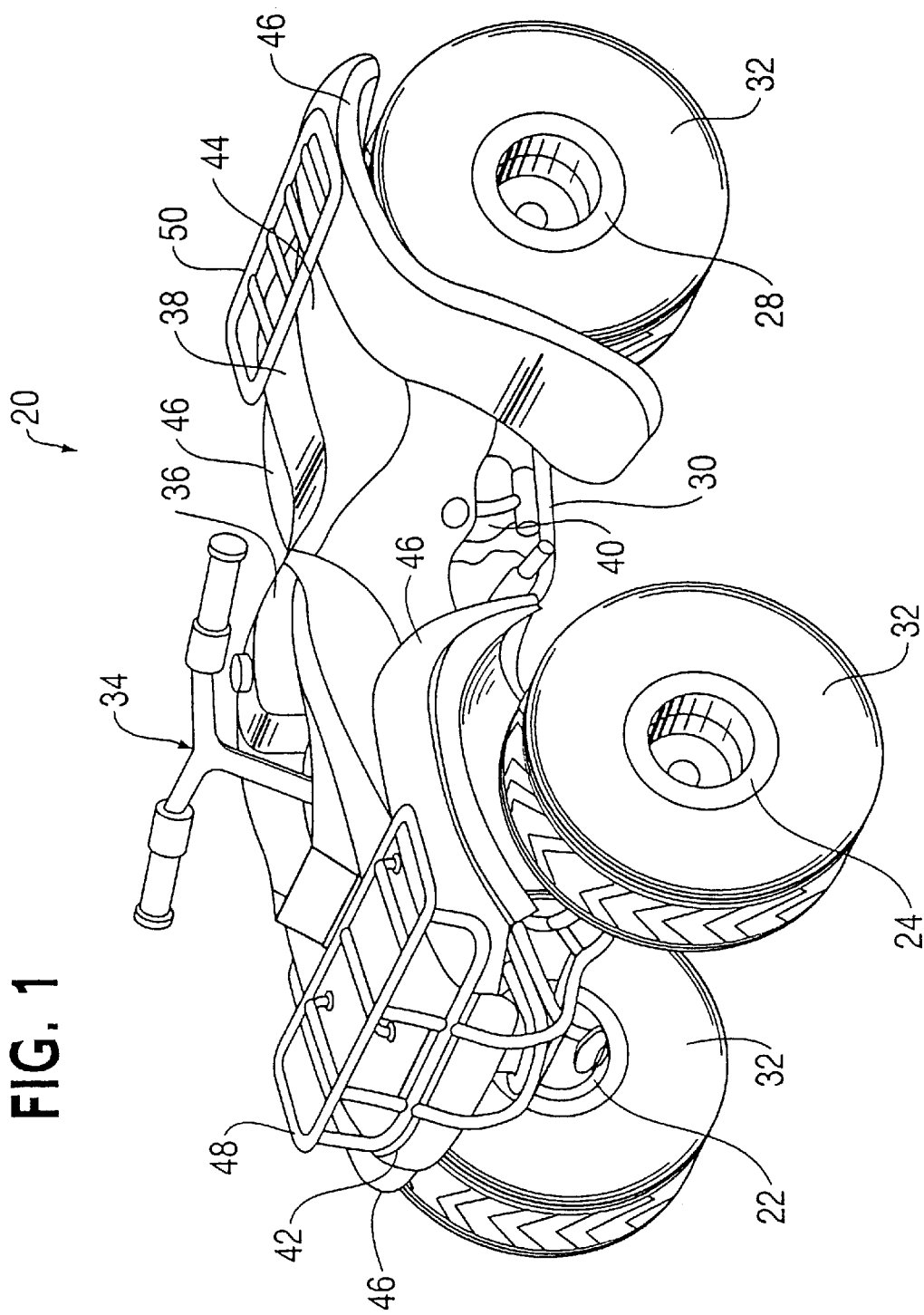
FIG. 1 is a perspective view of the saddle-seat vehicle incorporating the engine mount of the present invention.

Referring in detail to the drawings and with particular reference to FIG. 1, a saddle-seat vehicle 20 such as an all terrain vehicle, ATV, is shown. This saddle-seat vehicle 20 includes a pair of right and left front wheels 22, 24 and a pair of right and left rear wheels 26, 28 which are respectively suspended from front and rear portions of a vehicle frame 30. A balloon-type low pressure tire 32 is mounted around each of the front wheels 22, 24 and the rear wheels 26, 28. on the upper portion of the vehicle frame 30, a steering handle 34, a fuel rank 36, and a saddle-seat 38 are disposed. The rider sits on the seat 38. It is desired to avoid transfer of engine vibration to the seat 38 and rider to therefore provide a smoother ride. An engine 40 for driving the rear wheels 26, 28 is disposed within the vehicle frame 30.

A front body cover 42 and a rear body cover 44 are arranged over upper portions of the vehicle frame 30. The front body cover 42 and rear body cover 44 each include fenders 46 for covering upper portions of the front and rear tires 32. Front and rear cargo carriers 48, 50 are arranged over the front and rear body covers 42, 44 for allowing cargo to be secured thereto.

It should be appreciated that the foregoing features of the vehicle, such as the positioning and type of body cover, the use of cargo carriers, etc., could readily be varied. This description of the vehicle is merely given to provide an environment in which the vehicle frame can be used and is not intended to limit the instant invention. Moreover, it should be recognized that the instant invention can not only be applied in all terrain vehicles, but could also be utilized in other vehicles, such as motorcycles, snowmobiles, three-wheeled vehicles, etc.

Figure 2:
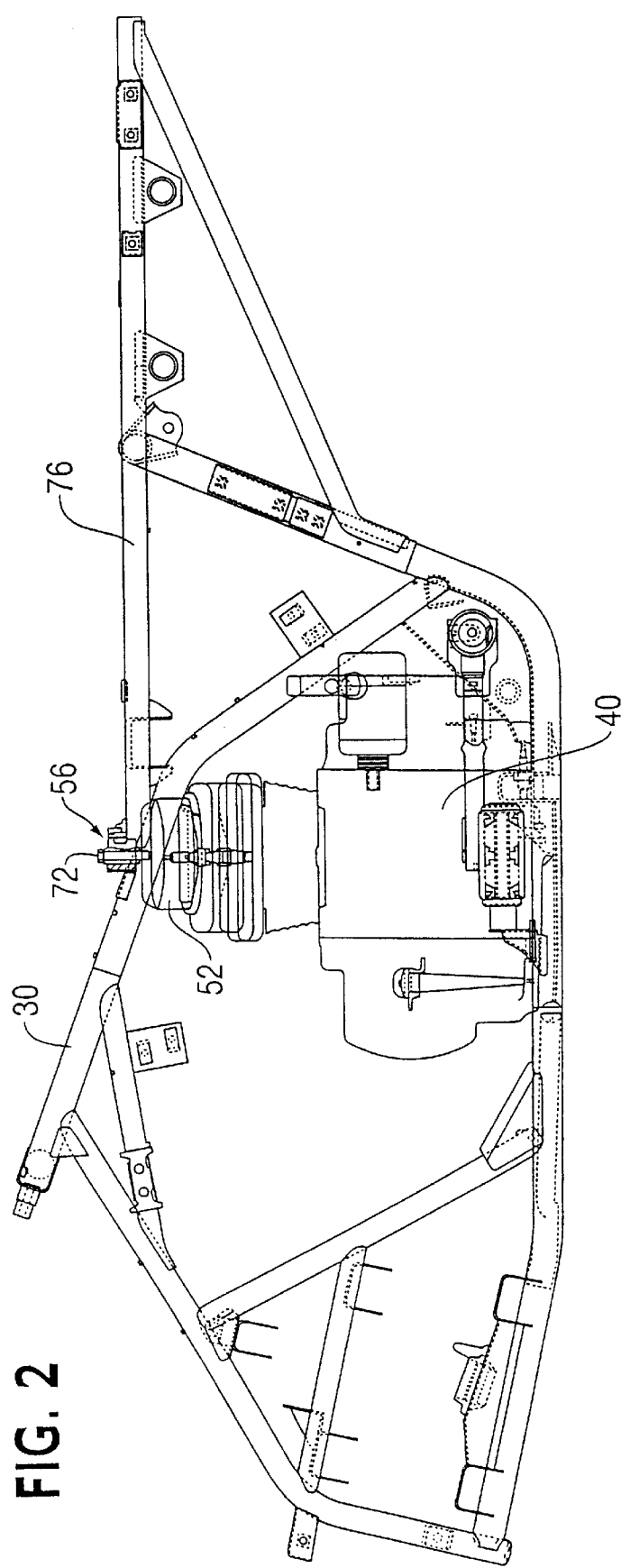
FIG. 2 is a side view of the engine mounting structure of the present invention.
Figure 3:
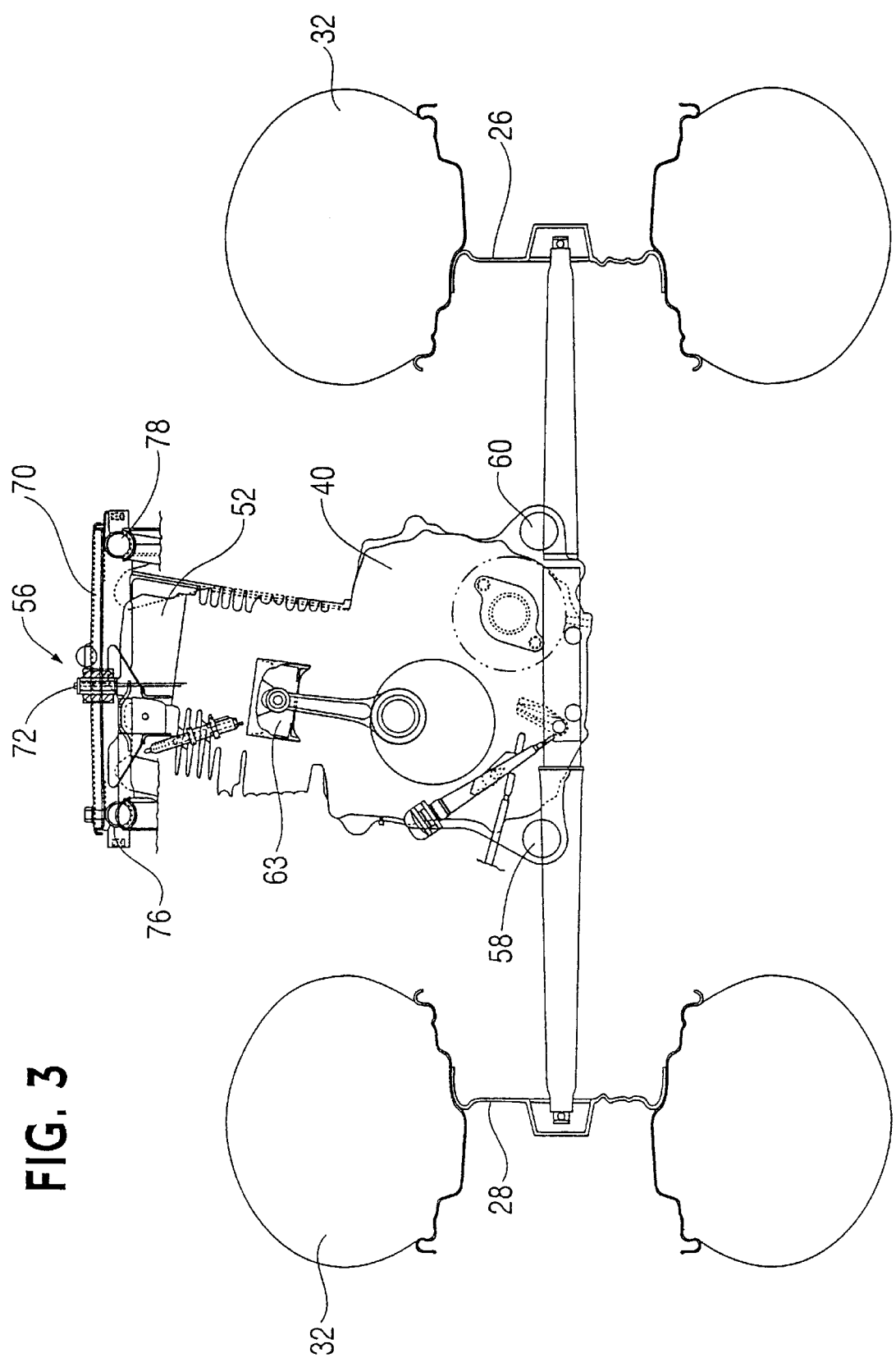
FIG. 3 is an end view partially showing the engine mounting structure of the present invention.

In FIGS. 2 and 3, an engine 40 is shown. It is contemplated that this engine 40 does not have a balance shaft so that vibration dampening would be very important for the present invention. Of course, the present invention can be used with an engine having a balance shaft.

Figure 4:
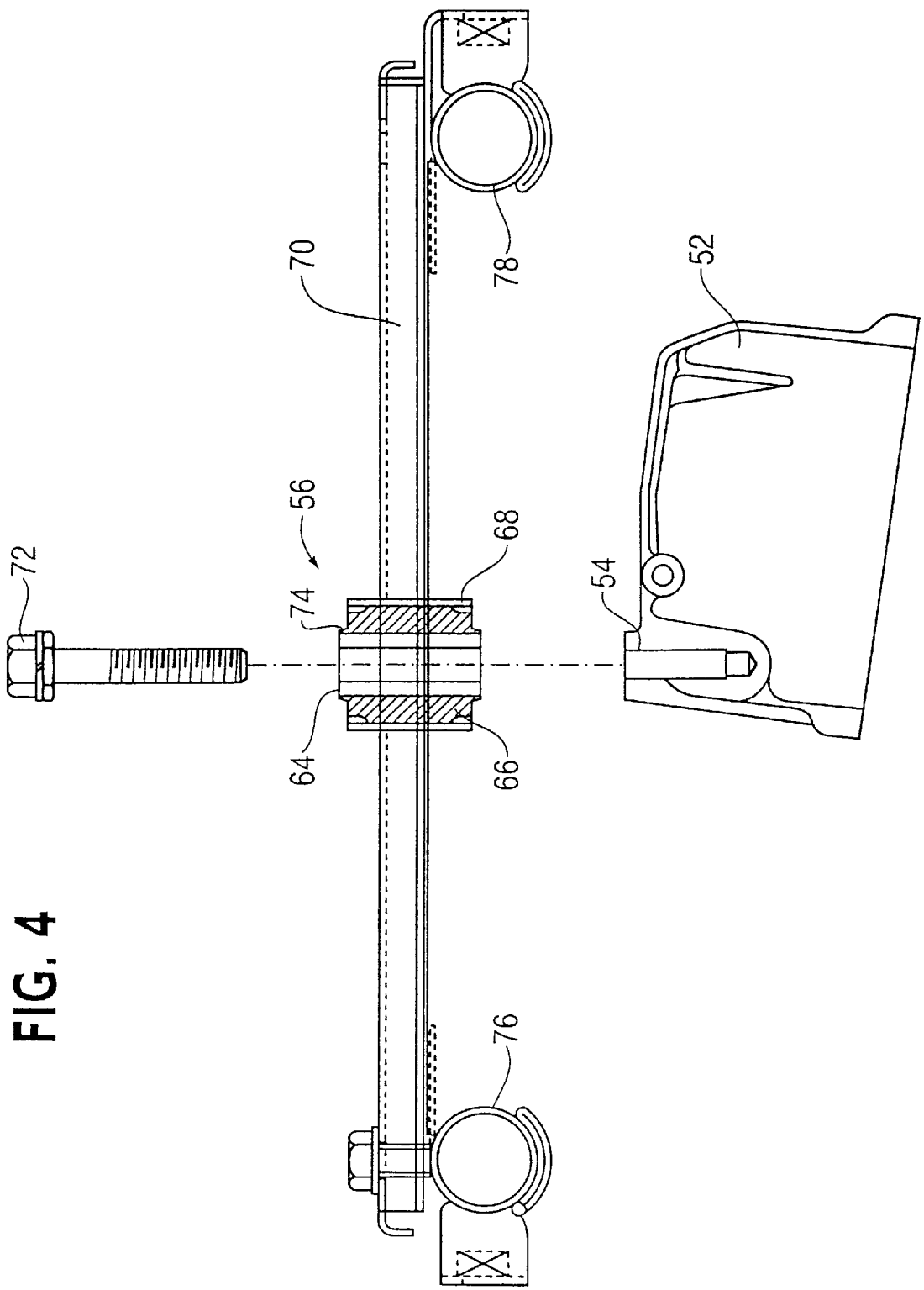
FIG. 4 is an exploded view showing how the plate bracket is attached to the cylinder head of the engine.

At the top of the engine 40 is a cylinder head cover 52. An opening 54 is provided in the cylinder head cover as indicated in FIG. 4. As best seen in FIG. 4, the upper engine mount 56 is connected to the cylinder head cover 52 using this opening 54 as will be described in more detail below.

Apart from the upper engine mount 56, there are two lower engine mounts 58, 60 as seen in FIG. 3. These lower engine mounts 58, 60 are described in more detail in Japanese document 6-140587 for example. In these mounts, rubber with a certain hardness is used. This rubber is harder than that in the upper engine mount 56. In other words, a stiffer rubber with a high spring rate is used in the two lower mounts 58, 60. These engine mounts 58, 60 must support the weight of the engine 40 and therefore, a rubber mounting with high spring dampening is not normally used.

Figure 7:
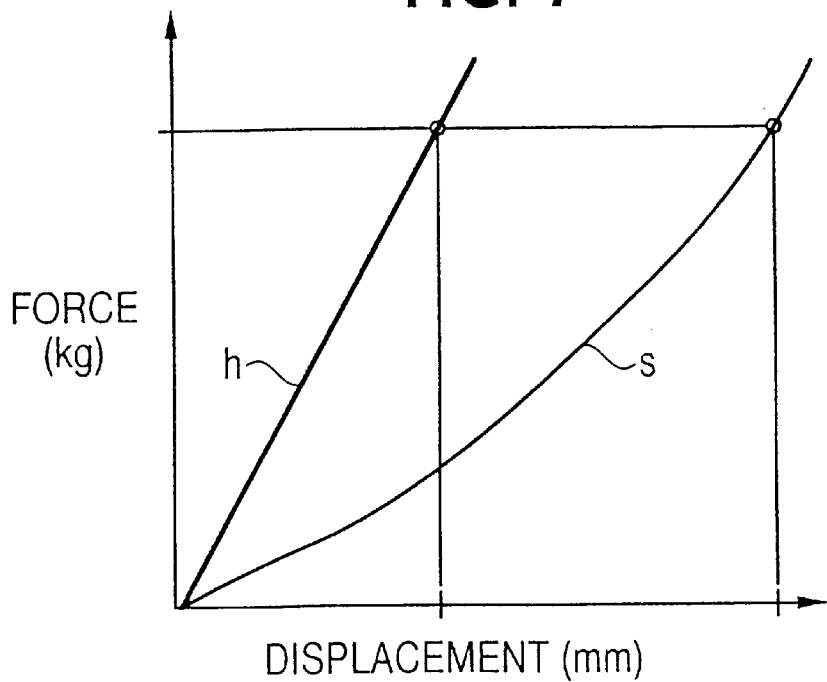
FIG. 7 is a graph indicating the relationship between force (kg) and movement (mm) of soft and hard rubber.

As indicated in FIG. 7 of the instant application, different rates of compression are possible with different types of rubber. In particular, FIG. 7 shows a soft rubber s. For such a soft rubber s, the amount of displacement or movement of the rubber (mm) has a certain relationship with the amount of force (kg) applied thereon. Also in FIG. 7, a hard rubber h has a different reaction in response to the amount of force applied. With a hard rubber h, less dampening will take place and therefore more vibration will be transmitted.

In the instant invention, it is desired to avoid the transfer of vibration from the engine 40 to the seat 38 and the rider.

In the prior art, a suggested solution has been to use a soft rubber mount as an upper engine mount. This arrangement helps to reduce the transfer of vibration. However, there is a time lag in operation and response time of the vehicle.

Figure 6:
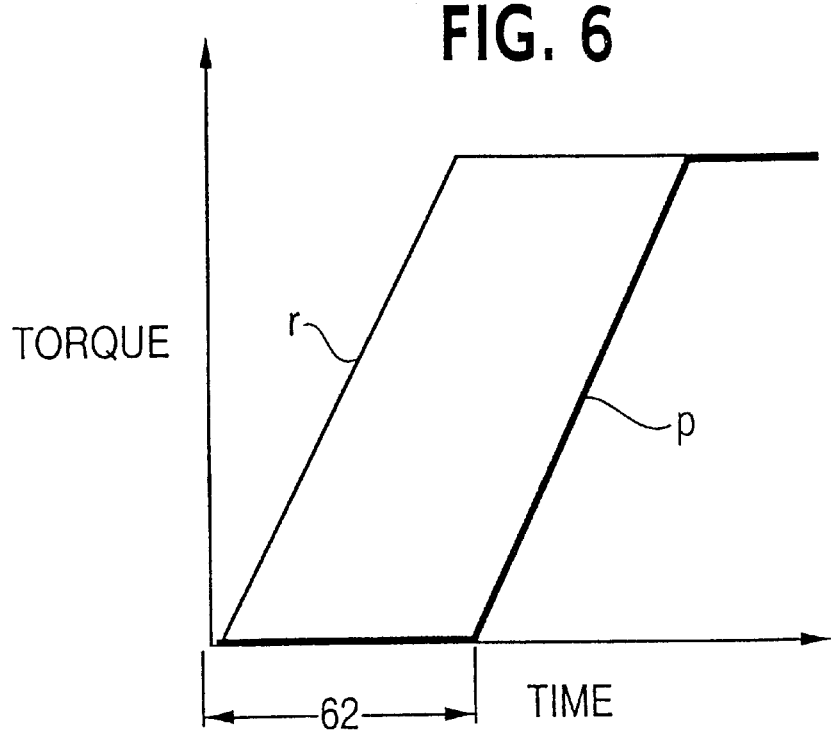
FIG. 6 is a graph explaining the relationship between torque and response time.

In particular, when the engine in such a prior art arrangement is accelerated, it has a tendency to torque or turn. If a soft rubber is used in the upper engine mount, then the engine can initially twist before the torque is transferred to the rear drive shaft. Therefore, a slight delay occurs between the time an operator starts to accelerate the vehicle and the time the vehicle actually begins to move. This time delay, or lag, 62 in the prior art response time p is illustrated in FIG. 6. After a predetermined period of time 62, the engine will no longer twist and the vehicle will begin to accelerate. This delay 62 in responsiveness adversely effects drivability of the vehicle.

In the instant invention, such a delay 62 is avoided as indicated by response time r in FIG. 6. In particular, when the driver accelerates the vehicle, it will immediately respond. Of course, there can be some minor time delay, but a delay as great as delay 62 indicated in FIG. 6 is avoided.

In the instant invention, the engine 40 moves in many different directions. Basically, these directions of movement can be broken into vibration in the vertical direction and vibration in the horizontal direction. This is especially true because no balance shaft is used in the engine. The rubber used in the mounts generally needs to absorb such vibration. In the vehicle, vertical vibration creates the greatest problem because the rider on the vehicle is more sensitive to this movement. In other words, such vertical vibration is directly transferred to the operator in an up and down jarring fashion. Due to the weight of the vehicle, engine 40 and operator, horizontal vibration is not as great of a problem. Nonetheless, this horizontal vibration should also be dampened.

Figure 5:
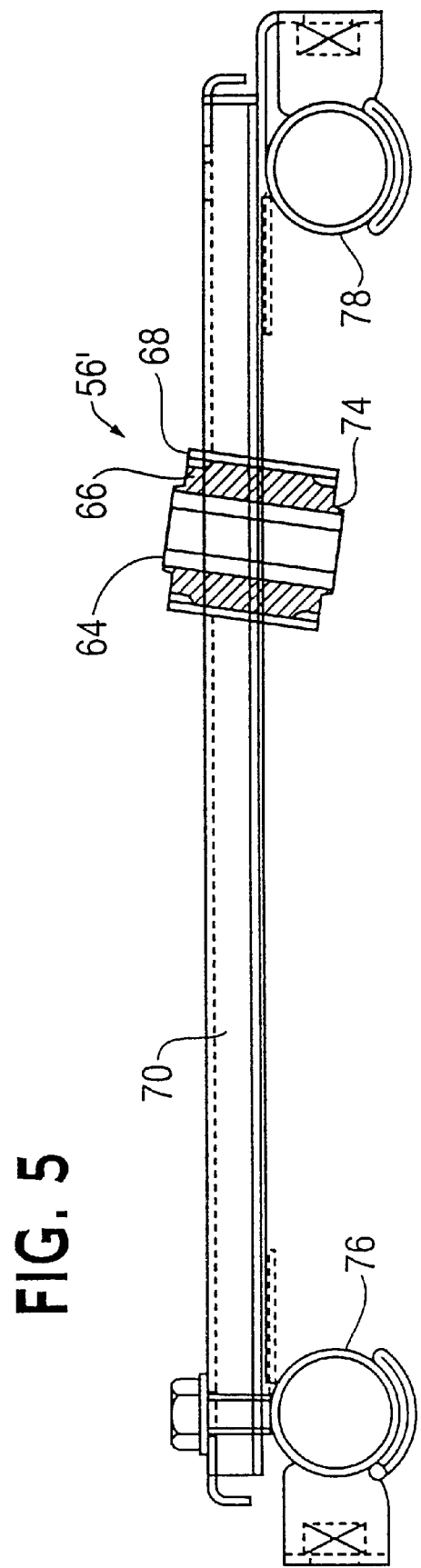
FIG. 5 is a modification of the plate bracket shown in FIG. 4.

Similarly to the lower engine mounts disclosed in Japanese document 6-140587, the instant lower engine mounts 58, 60 are horizontally oriented. The upper engine mount 56 in the present invention, however, is vertically oriented. Turning to FIGS. 4 and 5, this arrangement will be described in more detail.

FIG. 4 shows a first embodiment of the upper engine mount 56, while FIG. 5 shows a second embodiment of the upper engine mount 56'. The longitudinal axis of the upper engine mount 56 is generally vertical, whereas the longitudinal axis of the upper engine mount 56' is slightly inclined substantially parallel to the axis of travel of a piston 63 inside of the engine 40. Nonetheless, both of these upper engine mounts 56, 56' are substantially vertically oriented unlike the prior art designs. The first embodiment of the upper engine mount 56 is preferred, and therefore will be described in more detail. However, it should be understood that the following description is equally applicable to the second embodiment of the upper engine mount 56'.

In both embodiments, there is preferably an inner sleeve 64, an elastic cushion 66, and an outer sleeve 68. The inner sleeve is preferably made of metal, but any suitable material such as plastic can be used. Similarly, the elastic cushion is preferably made of rubber, but any suitable resilient material may be used. The outer sleeve 68 is rigidly affixed to a plate bracket 70. This plate bracket 70 is attached to the frame 30 and will be described in more detail below.

The inner sleeve 64 and elastic cushion 66 fit inside the outer sleeve 68. The elastic cushion 66 has an outer diameter which is slightly larger than the inner diameter of the outer sleeve 68. For example, the outer diameter of the elastic cushion 66 can be 0.5 mm larger than the inner diameter of the outer sleeve 68. This provides for some frictional mounting between the elastic cushion 66 and the outer sleeve 68. However, this frictional contact is so slight that the elastic cushion 66 is basically freely slidable within the outer sleeve 68. In other words, since the friction between the elastic cushion 66 and the outer sleeve 68 is relatively low, vertical vibration can easily be handled by the instant system. When the engine 40 transfers vertical vibration to the elastic cushion 66, the elastic cushion 66 can freely move up and downwardly within the outer sleeve 68. None of the vertical component of the vibration is transferred to the plate bracket 70. Therefore, no vertical vibration is ultimately transferred to the seat 38 or the rider.

The end of the inner sleeve 64 can rest on the cylinder head cover 52. A bolt 72 or other connector can pass through the inner sleeve 64 for threadable engagement into the opening 54 of the cylinder head cover 52 in order to affix the two members together. Alternatively, a stud may be fixed to the cylinder head cover 52, and a nut or other fastener engaged to the projecting end of the stud after the elastic cushion 66 is placed onto the stud.

Other mounting arrangements are possible. The elastic cushion 66 may be utilized inside of the outer sleeve 68 without the use of the inner sleeve 64. In such an arrangement, the bolt 72 or other connector would pass through an aperture 74 in the elastic cushion 66 for threadable engagement in the opening 54 in the cylinder head cover 52. The elastic cushion 66 may be configured such that the bolt 72 freely passes through the aperture 74 for reciprocal movement of the bolt 72 with respect to the elastic cushion 66, or may be configured such that the bolt 72 is fixedly attached to the elastic cushion 66. If the bolt 72 is freely moveable within the aperture 74 in the elastic cushion 66, the elastic cushion 66 may be fixedly connected to the outer sleeve 68.

Further, the location of attachment of the upper engine mount 56 is not limited to the particular position of the cylinder head cover 52 as shown. This upper engine mount 56 can be connected to any other location on the cylinder head cover 52. For example, in FIG. 2, this upper engine mount 56 could be moved forwardly or rearwardly. Alternatively, the upper mount 56 can be mounted to the cylinder head or the cylinder of the engine 40 itself. Therefore, there is a great degree of freedom in designing the engine mounting structure of the present invention.

While the vertical component of the vibration has been discussed above, the upper engine mount 56 will also help to avoid transfer of the horizontal component of vibration to the seat 38 and the rider.

In particular, the outer sleeve 68 is rigidly affixed to the plate bracket 70. This plate bracket 70 extends between the left and right seat rails 76, 78, as shown in FIGS. 3–5. The plate bracket 70 is bolted to these seat rails 76, 78. The end of the seat rails 76, 78 are flattened into a crescent shape and welded to the vehicle frame 30. The seat 38 is supported by the seat rails 76, 78.

Figure 8:
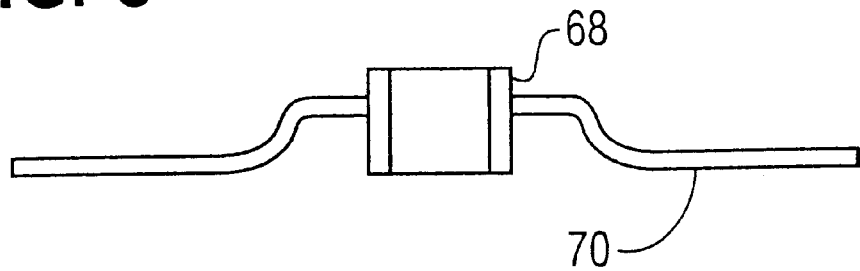
FIG. 8 is a side-sectional view of a first modification for a plate bracket used in the present invention.
Figure 9:
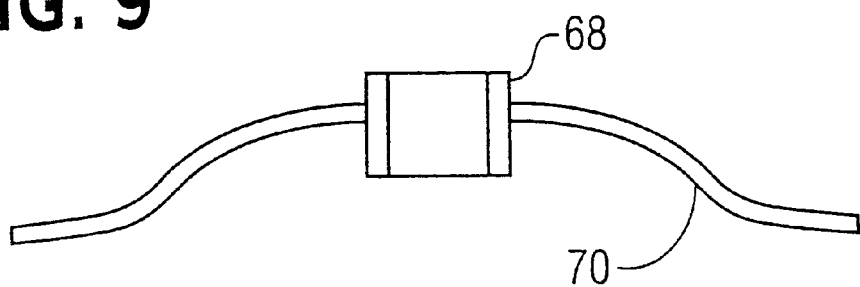
FIG. 9 is a side-sectional view of a second modification for the plate bracket used in the present invention.

In the prior art, it has been conventional to use a pipe or tube instead of plate bracket 70. Such a pipe is relatively rigid and therefore easily transfers vibration to the seat rails 76, 78. In the instant invention, on the other hand, the plate bracket 70 is less rigid and therefore absorbs some of the vibration. This plate bracket 70 can be flat as shown in FIGS. 4 and 5, or can have a curved or bowed shape, as shown in FIGS. 8 and 9. In other words, there would be a flat left-hand side for the modified seat bracket, an upward curve, a horizontal midsection, a downward curve and another flat right-hand side. As shown in FIG. 9, this bell-shaped curved arrangement, or arcuate profile, of the modified plate bracket would also aid in absorption of vibration in the horizontal direction. Of course, a downwardly curved bracket could also be used instead of the just described upwardly curved plate bracket.

Because the upper engine mount 56 is closest to the seat 38, it is good to absorb as much vibration as possible through this upper mount. As noted above, the vertical vibration component of the engine 40 is readily absorbed due to the sliding motion of the elastic cushion 66 relative to the outer sleeve 68, or due to the sliding motion of the bolt 72 relative to the elastic cushion 66. Due to the shape of the plate bracket 70, the horizontal vibration component of vibration can also be better absorbed than in the prior art. While the plate bracket 70 is rigid, it is not as rigid as a tube or cross pipe as has been used in the prior art. This plate bracket 70 can therefore absorb some of the horizontal vibration component.

Moreover, the modified form of the plate bracket (which is a curved or bowed shape) can absorb even more of the horizontal vibration component. While these plate brackets are more flexible than that used in the prior art, they nonetheless are sufficiently rigid to satisfactorily hold the engine in position through the upper engine mount 56 connection. Some modifications to this plate bracket 70 are shown in FIGS. 8–10.

Figure 10:
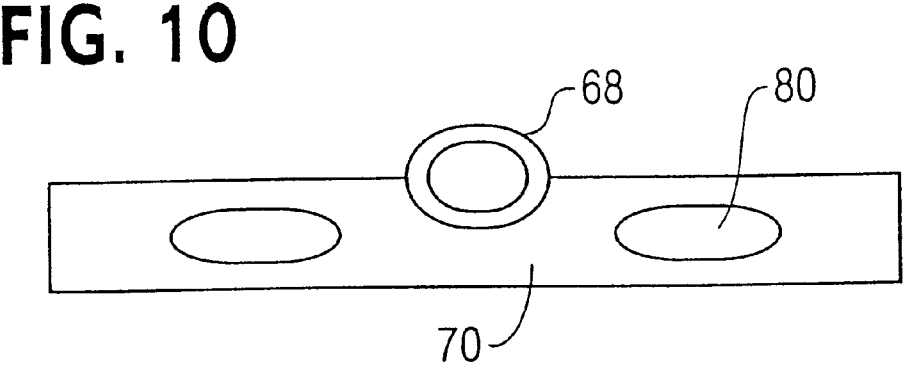
FIG. 10 is a top plan view of a third modification for the plate bracket used in the present invention.

The plate bracket 70 can be stepped as shown in FIG. 8, arched as shown in FIG. 9, or have an offset outer sleeve 68 as shown in FIG. 10. Many other changes for this plate bracket 70 are possible. For example, the plate bracket 70 may include lightening holes 80 as shown in FIG. 10 for decreasing the weight of the plate bracket 70 while increasing the flexibility of the plate bracket 70.

As noted above, the instant invention improves responsiveness of the vehicle. When the engine 40 is accelerated, there will be little or no lag time. The weight of the vehicle, the engine torque output and the spring rate of the rubber will all contribute to determine the response time. Because vertical vibration is not transmitted from the engine 40 to the seat 38 through the plate bracket 70 and seat rails 76, 78 only the horizontal component needs to be contended with in the upper engine mount 56. Therefore, a harder rubber can be used than that in the prior art. This harder rubber prevents torquing or twisting of the engine upon acceleration thereof. Therefore, the engine will not initially limitedly rotate before force is applied to the rear drive shaft.

The spring rate for the rubber used in the upper engine mount 56 can be selected to minimize time lag while effectively dampening the horizontal vibration component. Because the engine 40 must be supported by the two lower engine mounts 58, 60, it is difficult to vary the spring rate of these two mountings. However, the upper engine mount 56 can easily be reconfigured to vary the spring rate for the rubber used. Therefore, different response characteristics can be had with the instant engine mounting system.

In other engine mounting systems such as those described in Japanese document 6-140587, different interconnection components were needed between the engine mounting structure and the frame. For example, as seen in FIG. 2 of Japanese document 6-140587, a bracket is positioned between the engine E and the upper rubber mount Mu. Such a bracket can be avoided in the instant invention. Therefore, the number of parts in the instant design compared to prior engine mounting systems is reduced. This will simplify the manufacture of the engine mounting arrangement and will help to minimize costs.

Accordingly, several benefits will are obtained with the engine mounting system of the present invention. The system will avoid or reduce lag time upon acceleration of the engine 40. Therefore, a better response time is had and drivability of the vehicle is improved.

Also, vibration will be accommodated such that a smoother ride will be provided. The vertical vibration component of the engine 40 has little to no impact because it is not transferred through the upper engine mount 56, the plate bracket 70 and seat rails 76, 78. The plate bracket 70 can also help to accommodate the horizontal component of vibration along with the elastic cushion 66 of the upper engine mount 56.

Also, as noted above, brackets used in prior engine mounting systems can be avoided. Therefore, manufacture of the instant invention is simplified. Fewer assembly steps are required and the total cost of the engine mounting system can be reduced.

There is some control of lag time in the instant invention due to the selection of the spring rate for the rubber in the upper engine mount 56. There is therefore great freedom in selecting the spring rate of the upper engine mount 56 as there is no need to compensate for the vertical vibration component through the use of the elastic cushion 66.

The location of the upper engine mount 56 can also be greatly varied as noted above. This upper engine mount 56 can be connected to the cylinder head cover 52 as shown, or can be moved around the cylinder head cover 52 to many different positions. Also, the upper engine mount 56 could actually be mounted to the cylinder head or the cylinder. Therefore, there is a great degree of freedom in designing the vehicle.

The plate bracket 70 compensates for the horizontal component of vibration as noted above. This flat bracket or the modified form having a bell-shape or curved shaped bracket can be used instead of the conventional tube or cross pipe. This plate bracket 70 along with the elastic cushion 66 itself helps to compensate for the vertical component of vibration and therefore provides a smooth ride.

Although the present invention has been described with reference to the specific embodiment, it will be understood that the present invention is not limited thereto, and the same may be varied in many ways. For example, the engine 40 for driving the rear wheels 26, 28 is preferably a gasoline powered engine, but may include other types of internal combustion engines, or may alternatively be an electric motor. further, although rear wheel drive is shown herein, the present invention can be adapted for front wheel drive or all wheel drive, if desired.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An engine mount on a saddle-seat vehicle, said vehicle including a frame, at least one wheel, and an engine for driving said wheel, said engine mount comprising:

an upper engine mount operatively connected to the engine of the vehicle, the upper engine mount operatively connecting the engine to the frame of the vehicle, the upper engine mount including an outer sleeve operatively connected to said frame and defining an interior region therein;

at least one connector for connecting the engine to the upper engine mount with a portion of said at least one connector being arranged in said interior region of the outer sleeve for reciprocable movement therein; and an elastic cushion arranged between said portion of said at least one connector and said interior region of the outer sleeve, said elastic cushion including an aperture therein for passage of said at least one connector therethrough, whereby the upper engine mount permits substantially free vertical movement of the engine relative to the frame.

2. The engine mount on a saddle-seat vehicle according to claim 1, further comprising at least one lower engine mount operatively connected to the engine of the vehicle, the lower engine mount operatively connecting the engine to the frame of the vehicle.

3. The engine mount on a saddle-seat vehicle according to claim 2, wherein the at least one lower engine mount is horizontally oriented.

4. The engine mount on a saddle-seat vehicle according to claim 1, wherein the elastic cushion is fixedly attached to said portion of said at least one connector for relative reciprocable movement with respect to said interior region of the outer sleeve.

5. The engine mount on a saddle-seat vehicle according to claim 1, wherein the elastic cushion is fixedly attached to said interior region of the outer sleeve for relative reciprocable movement with respect to said portion of said at least one connector.

6. The engine mount on a saddle-seat vehicle according to claim 1, wherein the upper engine mount further includes an inner sleeve located at least partially within said aperture in said elastic cushion for passage of said at least one connector therethrough.

7. The engine mount on a saddle-seat vehicle according to claim 6, wherein the elastic cushion is fixedly attached to said inner sleeve for relative reciprocable movement with respect to said interior region of the outer sleeve.

8. The engine mount on a saddle-seat vehicle according to claim 7, wherein the elastic cushion is slidable along said interior region of the outer sleeve.

9. The engine mount on a saddle-seat vehicle according to claim 8, wherein the upper engine mount further includes a plate bracket operatively connected between said outer sleeve and said frame.

10. The engine mount on a saddle-seat vehicle according to claim 9, wherein the plate bracket includes lightening holes therein for decreasing weight of the plate bracket while increasing flexibility of the plate bracket.

11. The engine mount on a saddle-seat vehicle according to claim 1, wherein the outer sleeve is operatively connected to said frame in a manner allowing reciprocable movement of said at least one connector therein along a substantially vertical axis.

12. The engine mount on a saddle-seat vehicle according to claim 1, wherein the outer sleeve is operatively connected to said frame in a manner allowing reciprocable movement of said at least one connector therein along an axis substantially parallel to a linear axis of travel of at least one piston located within said engine.

13. The engine mount on a saddle-seat vehicle according to claim 1, wherein the at least one connector is threadably connected to a cylinder head of said engine.

14. The engine mount on a saddle-seat vehicle according to claim 1, wherein the upper engine mount further includes a plate bracket operatively connected between said at least one connector and said frame.

15. The engine mount on a saddle-seat vehicle according to claim 14, wherein the plate bracket extends between spaced-apart frame members and includes an outer sleeve therein for passage of said at least one connector therethrough.

16. The engine mount on a saddle-seat vehicle according to claim 15, wherein the plate bracket includes a pair of arm members extending outwardly from said outer sleeve, said arm members having an arcuate profile.

17. The engine mount on a saddle-seat vehicle according to claims 15, wherein the plate bracket includes a pair of arm members extending outwardly from said outer sleeve, said arm members having a stepped profile.

18. The engine mount on a saddle-seat vehicle according to claim 15, wherein the plate bracket includes a pair of arm members extending outwardly from said outer sleeve, with a central axis of said outer sleeve being displaced laterally with respect to a center line extending along said arm members.

* * * * *